Figure 1:
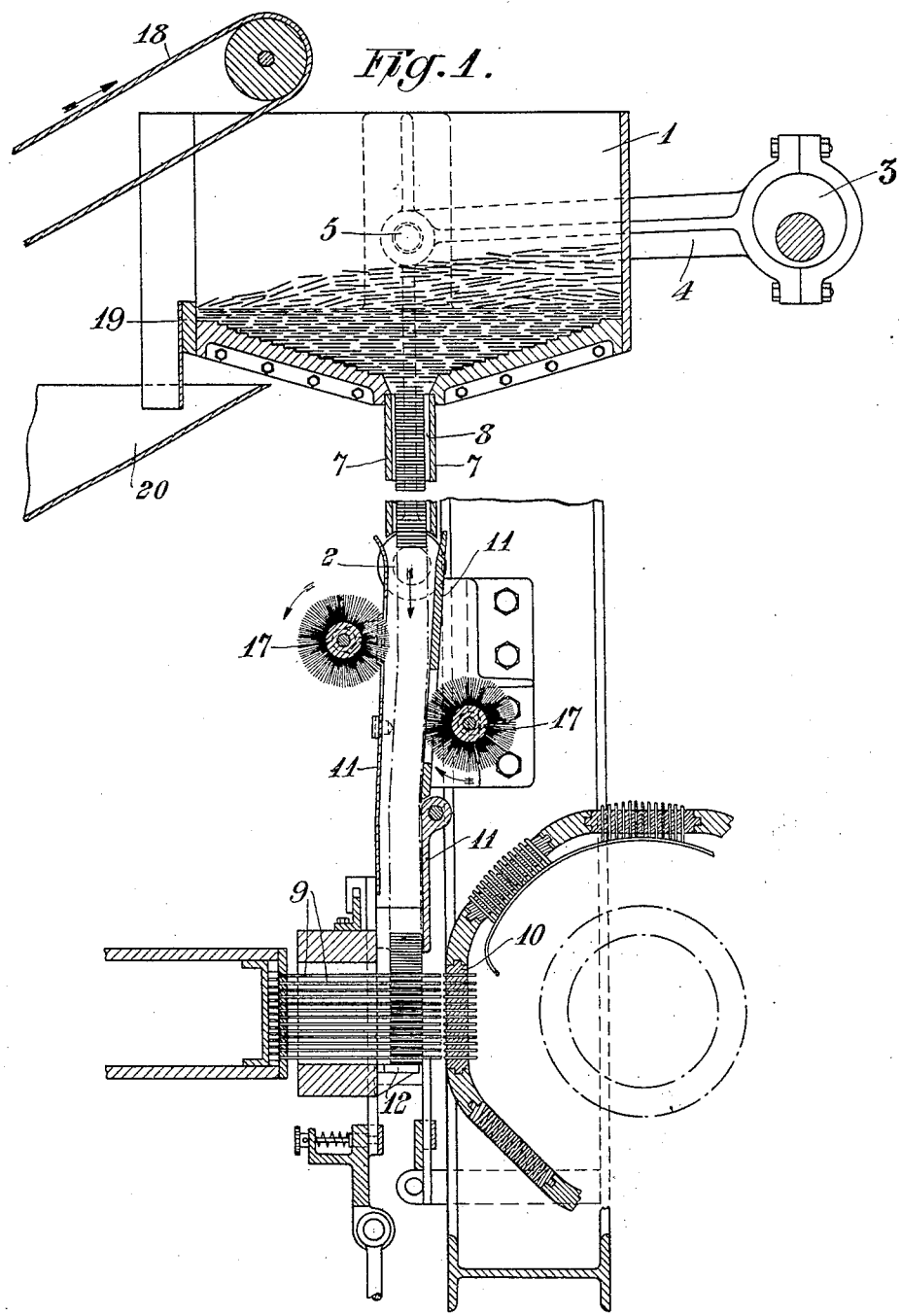

J. G. SJÖSTRÖM.
MACHINE FOR PUSHING MATCH SPLINTS INTO CONVEYER PLATES OR THE LIKE.
APPLICATION FILED MAR. 18, 1916.

1,236,992.

Patented Aug. 14, 1917.
4-SHEETS—SHEET 1.

J. G. SJÖSTRÖM.
MACHINE FOR PUSHING MATCH SPLINTS INTO CONVEYER PLATES OR THE LIKE.
APPLICATION FILED MAR. 18, 1916.

1,236,992.

Patented Aug. 14, 1917.
4 SHEETS—SHEET 4.

Witnesses:

Inventor:

UNITED STATES PATENT OFFICE.

JOHN GOTTHARD SJÖSTRÖM, OF JÖNKÖPING, SWEDEN.

MACHINE FOR PUSHING MATCH-SPLINTS INTO CONVEYER-PLATES OR THE LIKE.

1,236,992. Specification of Letters Patent. Patented Aug. 14, 1917.

Application filed March 18, 1916. Serial No. 85,104.

*To all whom it may concern:*

Be it known that I, JOHN GOTTHARD SJÖSTRÖM, a subject of the King of Sweden, residing at Jönköping, Klostergatan 9, in the Kingdom of Sweden, have invented a new and useful Improvement in Machines for Pushing Match-Splints into Conveyer-Plates or the like, of which the following is a specification.

This invention refers to a machine for pushing match splints into conveyer plates or the like which support the splints during their preheating and dipping into paraffin and igniting mixture. In order to make it possible to push the splints into the conveyer plates it is necessary to parallelize the splints, that is to say, to arrange the splints so as to place them parallel with one another. For this purpose it has already been proposed to arrange a parallelizing device above the pushing-in device, said parallelizing device consisting of a reciprocating receptacle for the unarranged splints. These prior machines are, however, of such construction as to be impractical, there being provided no means for regulating the supply of splints from the parallelizing device into the pushing-in device. On this account disturbances easily occur during operation which may necessitate the machine being stopped, emptied and cleaned before it can continue operation.

The present invention eliminates these disadvantages. The invention consists broadly in this that the receptacle of the parallelizing device intended for receiving the splints not yet put in order, is in such communication by means of one or more slots in its bottom, with the pushing-in device that the unarranged splints in the receptacle rest upon the parallelized splints sinking toward the pushing-in device. On account of this the operation of the parallelizing device and the supply to the pushing-in device is regulated automatically according to the consumption in the latter. If the pushing-in of the splints would cease entirely, no trouble would be caused as the piles of arranged splints would then only cease to sink until the pushing-in begins anew, and the excess of splints supplied to the receptacle will only be shaken off over the brim of the same. As furthermore, the receptacle may always be kept filled with unarranged splints the distribution of these over the entire breadth of the pushing-in device becomes perfectly uniform without special measures having to be taken. This invention thus provides for the first time a practicable combined parallelizing and pushing-in device.

Figure 2:
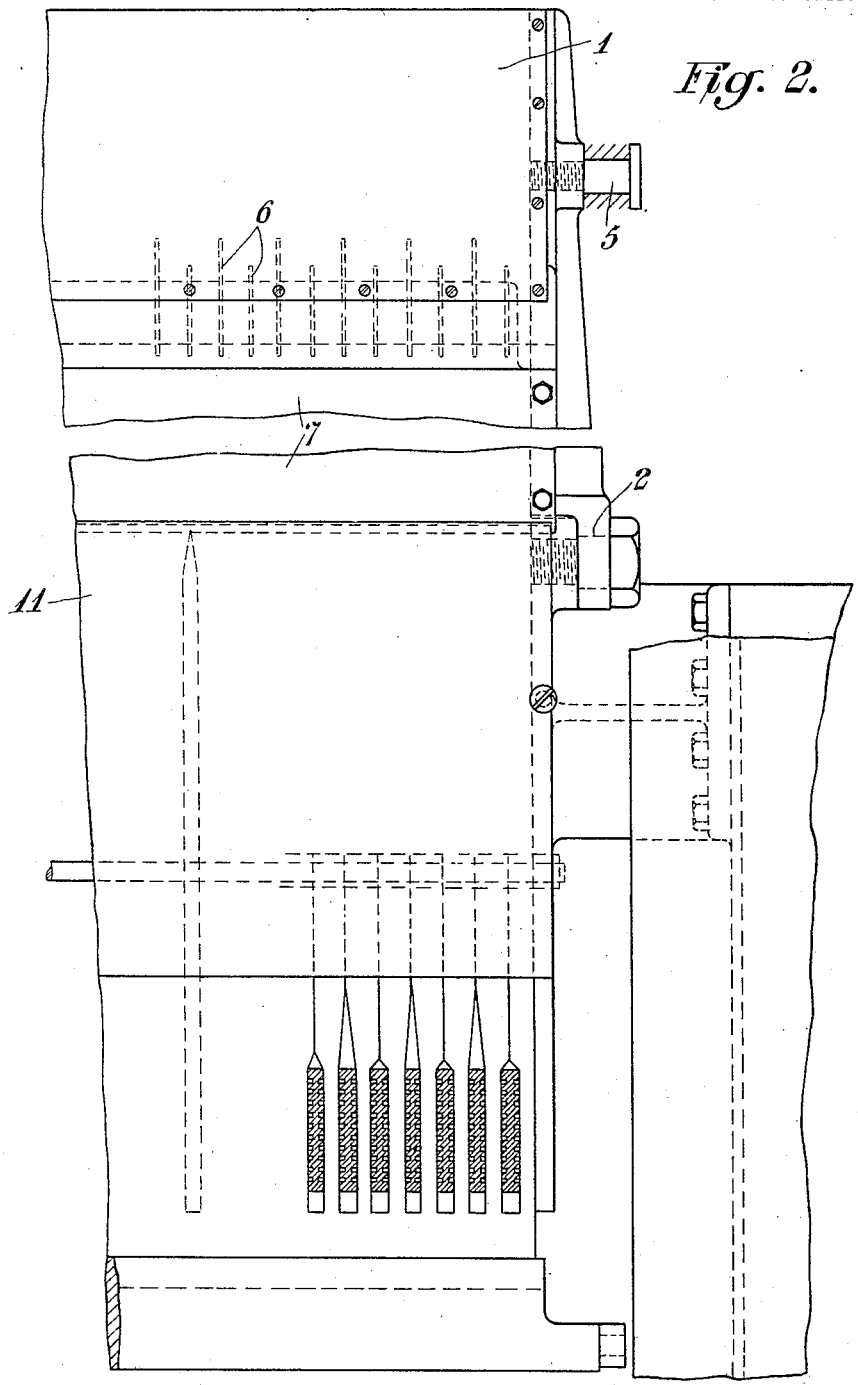
Figure 3:
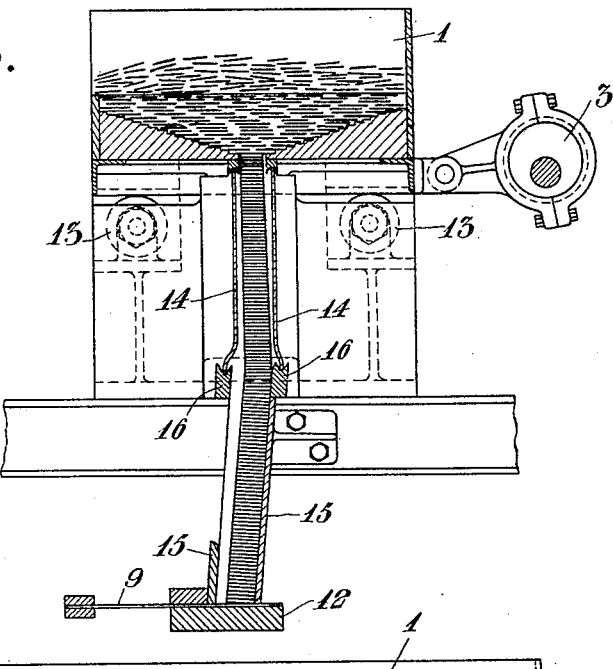
Figure 4:
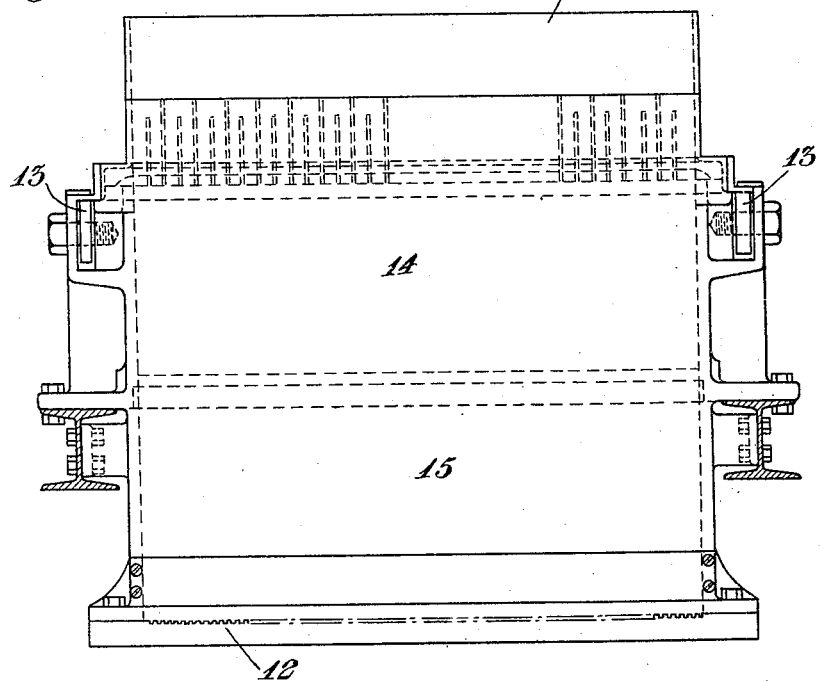
Figure 5:
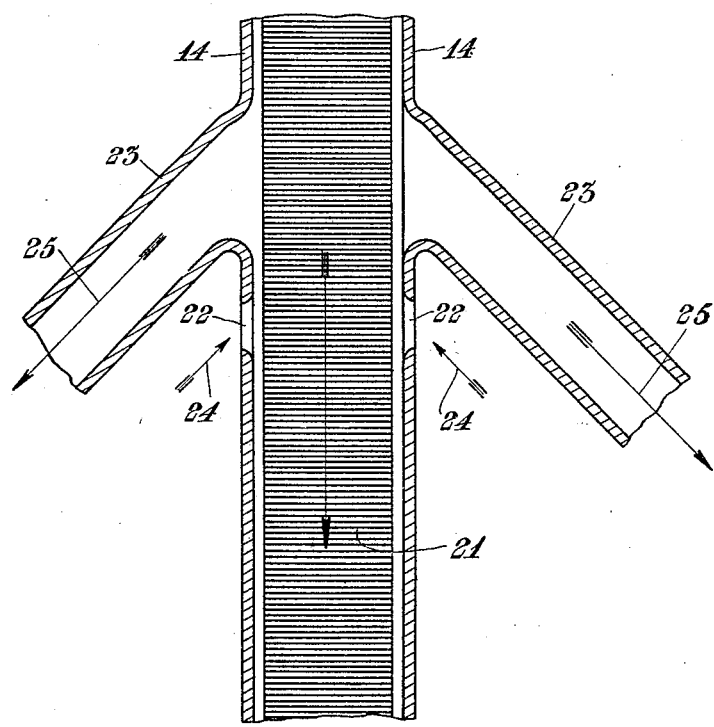

In the accompanying drawings two embodiments of the invention have been shown by way of example. Figure 1 shows a vertical section of the one embodiment, and Fig. 2 a front view of the same. Figs. 3 and 4 show similar views of the other embodiment. Fig. 5 illustrates a detail.

In both embodiments the parallelizing device is located above the pushing-in device so that the parallel splints reach the pushing-in device by action of gravity and, therefore, automatically. The parallelizing device consists of a receptacle 1 which in the embodiment according to Figs. 1 and 2, is fulcrumed on the pivots 2 and is put into a rapid oscillatory movement by means of the eccentrics 3 and the pitmen 4 which are pivoted on the studs 5 of the receptacle. In the receptacle 1 there are a number of partitions 6 which effect the arrangement of the splints when the receptacle is being rocked. These partitions 6 are parallel to one another and to the direction of movement of the receptacle.

The splints not yet put in order are emptied into the receptacle, either by hand or by means of a conveyer, or of compressed air, and so forth. Owing to the described rocking of the receptacle the splints gradually sink between the partitions 6 and place themselves parallel to one another. The bottom of the receptacle is provided with a longitudinal slot in the middle and on both sides it descends by steps and then at last wedge-shapedly toward this slot (compare Fig. 1). The steps are so arranged that the splints rocked forward and backward strike with their ends against these steps. On account of this the sinking splints gradually move toward the middle and fall down into the chute 8 formed by the walls 7, and further to the pushing-in device, where by means of the usual needles 9 the splints are pushed into the holes in the conveyer plates 10, or into special intermediate receivers.

The walls 7 which are fulcrumed on the pivots 2, support the entire receptacle 1 and take part in its rocking motion. These movable walls 7 are continued below the pivots 2 by stationary walls 11, which serve as guides for the sinking splints. Below the pushing-in needles 9 there are provided stationary bottoms 12 which support the entire pile of splints and prevent the same from falling past the needles.

In Figs. 3 and 4 another embodiment is illustrated in which the receptacle 1 rests on rollers 13 and is movable forward and backward in the horizontal direction. This motion is effected by means of an eccentric 3 as in the first embodiment. The parallel splints are guided during their downward movement from the receptacle 1 to the stationary bottom 12, where they are seized by the pushing-in needles 9, by upper movable walls 14 and lower stationary walls 15, the first-named of which connect the reciprocating receptacle 1, with the stationary walls 15. For this purpose the lower edges of the movable walls 14 rest in grooves in the upper side of the stationary rails 16, while the upper edges of the said walls are supported in similar grooves in the lower side of the receptacle 1. In this manner the upper portions of the walls 14 take part in the reciprocating movement of the receptacle 1, while their lower edges remain stationary so that the parallel splints gradually come to rest during their downward movement.

In Fig. 1 is further shown an arrangement for removing such splints which arrive in the space between the walls 14 not properly arranged, thus for instance standing on ends. This arrangement consists of rotary brushes 17 not shown in Fig. 2 or the like which projects into openings in the walls 14. These brushes rotate in the directions indicated by the arrows, that is to say with the portions of the same projecting through the openings moving in the reverse direction to the direction of movement of the sinking splints. They thus remove all splints falling through while standing on ends so that these splints will not reach the pushing-in device with the operation of which they might have interfered.

In Fig. 1 an arrangement for automatic supply of splints to the receptacle 1, is also shown. This arrangement consists of an endless band 18 moving in the direction of the arrow. One side wall 19 of the receptacle 1, suitably the wall adjacent the band 18, is lower than the others in order to make it possible, when an excess of splints is supplied, to shake out this excess by the rocking of the receptacle, when it is gathered in a hopper 20 or the like and again supplied to the band 18. By this arrangement the advantage is attained that the supply of splints to the receptacle 1 need not be very accurately regulated to suit the consumption, a fact which materially simplifies the handling of the machine.

Finally, Fig. 5 shows another arrangement for removing the splints falling through. This is effected by means of two currents of air which pass one on each side of the pile 21 of sinking parallel splints. These currents of air are introduced through the openings 22, 22 and return through the tubes 23, 23. Thus they flow in the direction of the arrows 24 and 25 and bring along splints which may be falling through so that these splints do not reach the pushing-in device.

I claim:

1. In a machine for pushing match splints into conveyer plates the combination of a pushing-in device, and a parallelizing device consisting of a reciprocating receptacle arranged above the pushing-in device and provided with a slot in its bottom, said receptacle being by means of said slot in such communication with the pushing-in device that unarranged splints in the receptacle rest on the parallelized splints sinking toward the pushing-in device.

2. In a machine for pushing match splints into conveyer plates, the combination of a pushing-in device, a parallelizing device consisting of a reciprocating receptacle arranged above the pushing-in device and provided with a slot in its bottom, said bottom descending toward the slot on both sides of the same, and a chute below said slot placing said receptacle in such communication with said pushing-in device that unarranged splints in the receptacle rest on the parallelized splints sinking through the chute toward the pushing-in device.

JOHN GOTTHARD SJÖSTRÖM.

Copies of this patent may be obtained for five cents each, by addressing the "Commissioner of Patents, Washington, D. C."